Jan. 8, 1946.  G. A. SILVERSPARRE  2,392,616
BUFFER MEANS FOR VEHICLE LATERAL MOTION MECHANISM
Filed April 27, 1944  2 Sheets-Sheet 1

INVENTOR:
Gustav Arent Silversparre,
BY Paul Paul
ATTORNEYS.

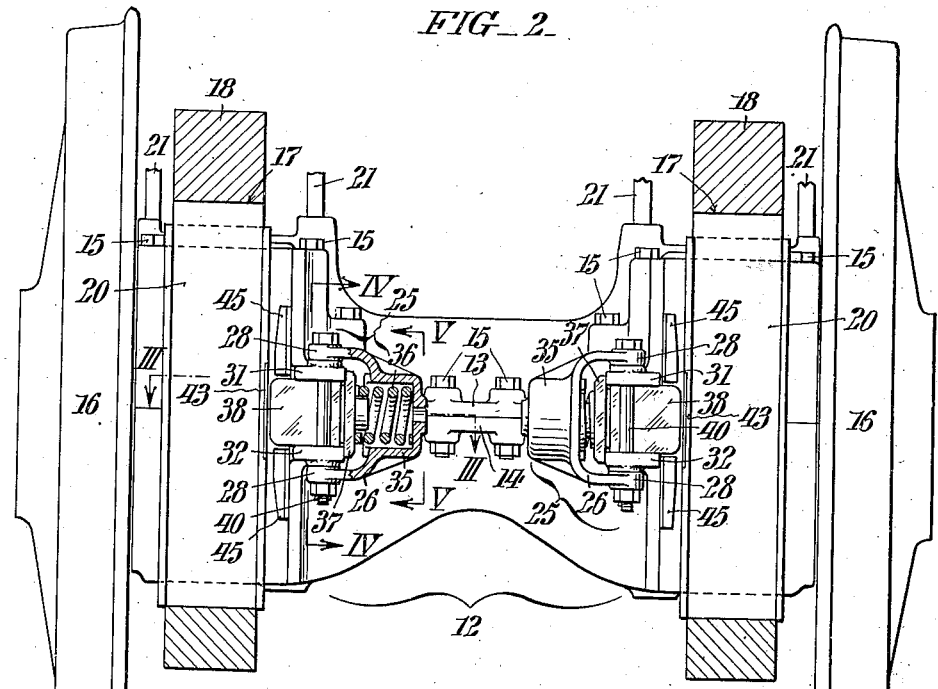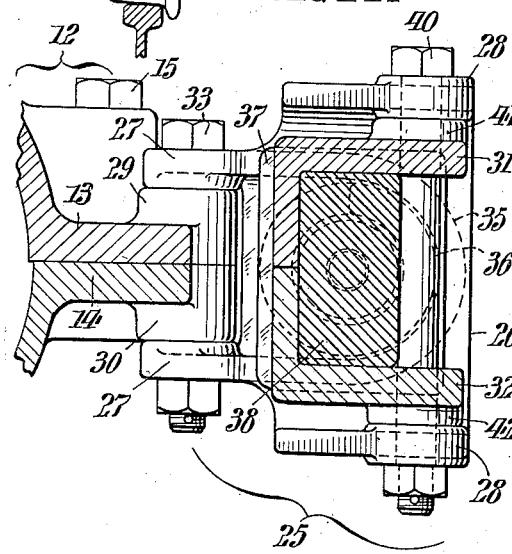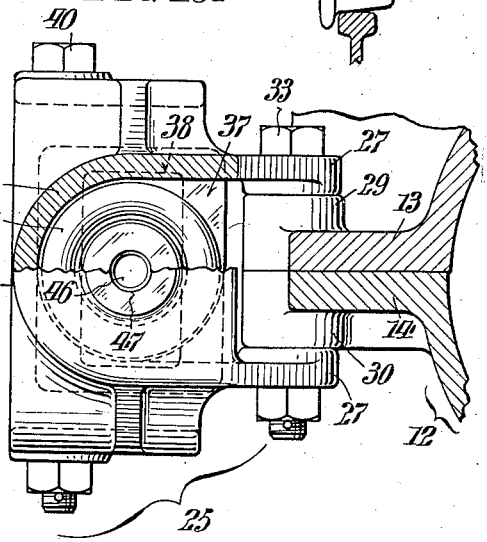

Patented Jan. 8, 1946

2,392,616

UNITED STATES PATENT OFFICE 2,392,616

BUFFER MEANS FOR VEHICLE LATERAL MOTION MECHANISM

Gustav Arent Silversparre, Narberth, Pa., assignor to The Pennsylvania Railroad Company, Philadelphia, Pa., a corporation of Pennsylvania Application April 27, 1944, Serial No. 533,071

6 Claims. (Cl. 105—80)

This invention relates to buffer means for lateral motion mechanism on railway vehicles such for example as locomotives, wherein a certain amount of lateral play must be allowed as between wheel axles on fixed centers and the vehicle underframes in order to facilitate travel on curved track sections.

More specifically the invention has to do with buffer means useful in connection with lateral motion mechanism of the type disclosed in U. S. Patent No. 2,047,666 granted to J. G. Blunt on July 14, 1936, in which the wheel axle journal bearings are enclosed within a housing capable of shifting bodily in openings in the side frames of the vehicle. In the patented construction the buffing means extends crosswise from one side frame of the locomotive to the other and thus take up space centrally of the vehicle structure at opposite sides of the wheel axles necessary for the accommodation of parts of certain forms of brake rigging and/or other mechanisms.

The chief aim of my invention is to overcome this drawback, which desideratum I attain as hereinafter more fully disclosed, through provision of a buffer means comprising a plurality of separate and independently-operable buffer devices which are compact and of such form that they can be located in the interval between the side frames of the railway vehicles and yet allow a sufficient interval centrally of the vehicle structures for the purposes mentioned.

A further aim of my invention is to secure the foregoing advantages in a buffer means in which the individual buffer devices are of simple and inexpensive construction and lend themselves to ready application to and removal from the lateral motion mechanism.

Other objects and practical advantages will appear from the following detailed description of the attached drawings, wherein Fig. 1 is a fragmentary view in horizontal section of a locomotive structure conveniently embodying the lateral motion buffer means of my invention.

Fig. 2 is a transverse sectional view taken as indicated by the angled arrows II—II in Fig. 1.

Figs. 4 and 5 are fragmentary detail sectional views likewise drawn to a larger scale and taken as indicated respectively by the arrows IV—IV and V—V in Figs. 1 and 2.

Figure 1:
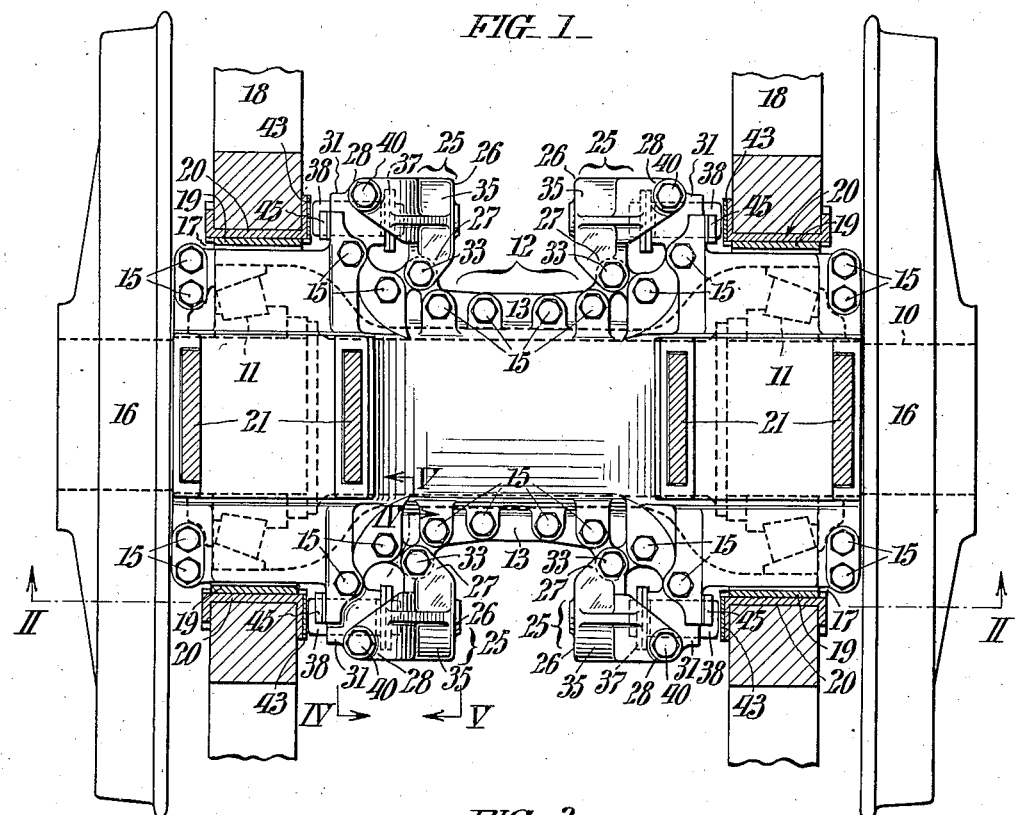

With detailed reference first more especially to Figs. 1 and 2 of these drawings, the numeral 10 designates one of the drive wheel axles of the locomotive which is journaled in roller bearings 11 enclosed within a diametrically split housing 12. As shown the upper and lower halves of this housing 12 are longitudinally flanged as at 13 and 14 and secured together at suitable intervals by screw bolts 15 passing through the said flanges. In the illustrated instance the housing 12 completely encloses the portion of the axle 10 in the interval between the drivers 16 and has its opposite ends extending with clearance above and below, through vertical openings 17 in the side frames 18 of the locomotive. At opposite sides of its ends the housing 12 is provided with wear plates 19 which bear against channel section liners 20 fitted over the vertical side edges of the openings 17. At 21 are indicated the hangers of a spring suspension (not illustrated) for the shaft housing 12. The housing 12 is thus guided for vertical movement in the side frames 18 and also has the capacity to move endwise, i. e., laterally relative to said frames together with the shaft and wheel assemblage, the latter in order to facilitate travel of the locomotive on curved track sections in a well known manner.

Figure 3:
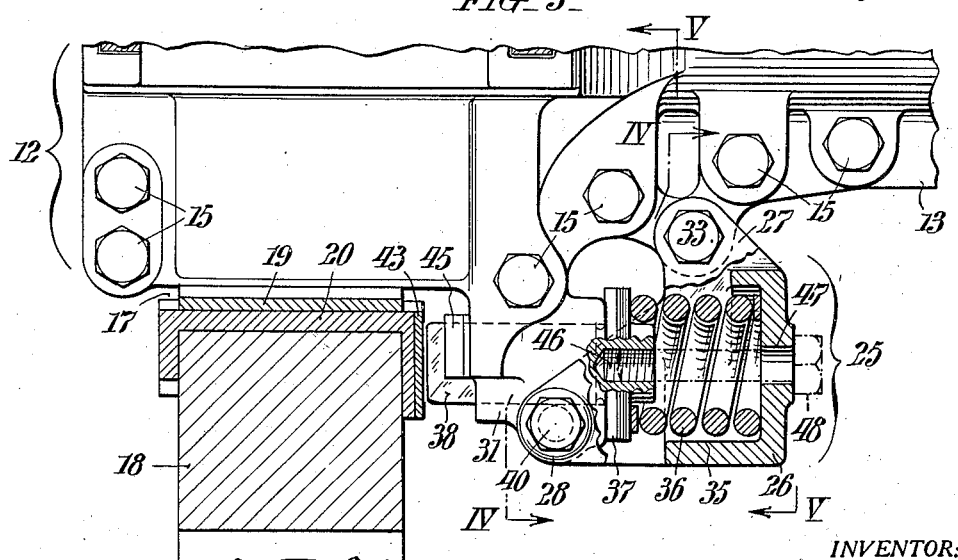
Fig. 3 is a fragmentary view corresponding to Fig. 1 on a large scale with one of the component buffer devices partly in section taken as indicated by the angled arrows III—III in Fig. 2.

The novel means which I have provided for buffing the lateral motion of the axle bearing housing 12 comprises a plurality of independently-operable buffer devices which are individually designated comprehensively by the numeral 25. These buffer devices are identical in construction so that the description immediately following will be confined to one of them with the understanding that it applies to the others as well. As shown each of the buffer devices 25 comprises a bracket member 26 with laterally and longitudinally projecting ears 27 and 28. The lateral ears 27 are vertically spaced to span apertured bosses 29 and 30 on the flanges 13 and 14 of the upper and lower halves of the bearing housing 12 as best shown in Figs. 3-5, and the ears 28 similarly spaced to span apertured lugs 31 and 32 which extend outwardly from said housing halves as best shown in Figs. 3 and 4. A screw bolt 33 passing through registering apertures in the ears 27 and in the bosses 29 and 30 serves as a means for detachably securing the bracket 26 to the bearing housing 12, and at the same time aids in securing the components 13 and 14 of said housing together. From Figs. 2 and 3 it will be noted that the bracket 26 has a hollow body portion 35 which affords an annular socket or retaining seat for one end of a helical compression spring 36 whereof the other end bears against the flange head 37 of a plunger 38 which is of rectangular cross section and guided for endwise movement between the lugs 31 and 32 on the bearing housing 12. A bolt 40 passing through registering apertures in the ears 28 of the bracket 26 and in bosses 41 and 42 on the lugs 31 and 32 on the bearing housing 12 acts as a keeper for the plunger 38, which latter, by action of the spring 36, is yieldingly thrust outward so as to normally protrude beyond the sides of said lugs into close proximity to the inner side flange of one of the liners 20 in the opening 17 of the contiguous side frame 18 of the locomotive, said flange being faced with a hardened inset wear plate 43. Attached to the bearing housing 12 above and below the lugs 31 and 32 are stops 45 which serve for a purpose presently explained.

Shifting of the bearing housing 12 incident to a leftward thrust, for example, upon the drivers 16 in entering a curved section of the track, will be attended by engagement of the plungers 38 of the buffer devices 25 at the left-hand side of Figs. 1 and 2 with the wear plates 43 on the contiguous side flanges of the liners 20 on the corresponding side frame 18 of the locomotive. As the plungers 38 recede, their movement will be gradually retarded by the yielding but accumulating power of the buffer springs 36 so that the wheel-shifting action will take place without appreciable shock or noise. In the event of sudden abnormal lateral thrusts of the wheels 16, the stops 45 at the left-hand side of Fig. 1 will contact the inner flanges of the liners 20 in the corresponding frame 18 and thus prevent excessive shifting of the bearing housing 12. Thrusts of the wheels 16 in the opposite direction will be absorbed in a like manner by the buffer devices 25 at the right-hand side of Figs. 1 and 2. By reason of the compactness of the devices 25 and their location immediately adjacent the side frames 18 it will be seen from Fig. 1 that substantial clearances are provided at opposite sides of the housing 12 between the transversely aligned pairs of said devices for disposal of moving elements of certain types of brake rigging or other mechanism which may be found desirable for embodiment in the locomotive structure.

In order to facilitate the individual application or removal of the buffer devices 25, I have provided each plunger 38 at the rear with a tapped axial hole 46, and the back of the socket 35 in the corresponding bracket 26 with an axially aligned aperture 47. After passing the shank of a screw bolt, such as indicated in dotted lines at 48 in Fig. 3, through the aperture 47 and engaging it into the tapped hole 46 in the plunger 38, I draw up on said screw bolt to compress the spring 36 sufficiently to relieve the clamp bolts 33 and 40 of strain, whereupon the latter can be readily withdrawn and the buffer device 25 removed as a unit. Application of the device is accomplished by reversal of the above procedure.

While I have, by way of example, illustrated and described my invention in connection with a locomotive structure, it is not to be considered as limited to such use, since by modifications within the scope of the appended claims, it can be adapted to other types of rail vehicles in which the wheel axles are on fixed centers, without sacrifice of the advantages hereinbefore pointed out.

Having thus described my invention, I claim:

1. Buffer means for a railway vehicle wherein the portion of an axle between wheels rotates within a longitudinally split bearing housing which is shiftable endwise with the wheel axle relative to the sides of the frame of the vehicle and which has its components secured together by securing bolts, said buffer means comprising independently operable buffer devices respectively positioned adjacent corresponding faces of the frame sides, and each such device including a separately-attached abutment bracket with apertured projections adapted for passage through them of certain of the housing connecting securing bolts, a plunger guided in a boss on the housing and arranged to engage the contiguous face of the frame, and a resilient element in compression between said abutment bracket and said plunger.

2. The invention according to claim 1, wherein the resilient element is in the form of a helical spring, and wherein the abutment bracket provides a socketed retaining seat for the spring.

3. The invention according to claim 1, further including stop means for engaging a plunger-guiding projection on the axle housing to limit the extent of protrusion of the plunger.

4. The invention defined in claim 1, wherein the plunger is provided with a flange which cooperates with the guide boss on the axle housing to limit the extent of its protrusion.

5. The invention according to claim 1, wherein the bearing housing is movable up and down and has its ends slidably engaged in vertical guideways in the side frames, wherein liners of channel cross section are engaged over the side edges of the vertical guideways to bear against the ends of the housing, and wherein the plungers of the buffer devices react with the contiguous side flanges of the channel section liners aforesaid.

6. A buffer device according to claim 1, wherein the resilient element is of hollow cylindric configuration; and wherein the rear end of the plunger is provided with a tapped axial hole, and the bottom of the socket of the bracket with an aligned aperture to permit the use of a headed bolt to draw up upon the plunger and compress the spring element and so facilitate application of the bracket to, and its removal from, a supporting member.

GUSTAV ARENT SILVERSPARRE.